(12) United States Patent
Jaeger

(10) Patent No.: US 6,382,886 B1
(45) Date of Patent: May 7, 2002

(54) METHOD FOR DISCHARGING CUTTING PRODUCTS FROM A METAL-CUTTING MACHINING PROCESS

(75) Inventor: Walter Jaeger, Hilter (DE)

(73) Assignee: Multimatic Oberflaechentechnik GmbH & Co., Hilter (DE)

( * ) Notice: Subject to any disclaimer, the term of this patent is extended or adjusted under 35 U.S.C. 154(b) by 0 days.

(21) Appl. No.: 09/545,511

(22) Filed: Apr. 7, 2000

(30) Foreign Application Priority Data

Apr. 7, 1999 (DE) .......... 199 15 619

(51) Int. Cl.[7] .............. B23C 3/00; B23B 35/00
(52) U.S. Cl. .......... 409/131; 82/1.1; 408/1 R; 451/28
(58) Field of Search .............. 409/131, 132, 409/136, 1 R; 451/28; 82/1.11; 184/6.14

(56) References Cited

U.S. PATENT DOCUMENTS

| | | | | |
|---|---|---|---|---|
| 4,829,859 A | * | 5/1989 | Yankoff | 82/1.11 |
| 5,108,512 A | * | 4/1992 | Goffnet et al. | 134/7 |
| 5,129,190 A | * | 7/1992 | Kovach et al. | 82/900 X |
| 5,592,863 A | * | 1/1997 | Jaskowiak et al. | 408/56 X |
| 5,632,150 A | * | 5/1997 | Henzer | 451/53 X |
| 5,651,834 A | * | 7/1997 | Jon et al. | 134/31 |
| 5,733,174 A | * | 3/1998 | Bingham et al. | 451/39 |
| 6,174,225 B1 | * | 1/2001 | Becker | 451/75 |

FOREIGN PATENT DOCUMENTS

| | | | | |
|---|---|---|---|---|
| DE | 4230625 | * | 3/1994 | 409/136 |
| DE | 43 26 517 | | 2/1995 | |
| EP | 0 911 113 | | 4/1999 | |
| FR | 2724337 | * | 11/1996 | 82/1.11 |

OTHER PUBLICATIONS

Brochure distributed by AGA GmbH, "Reinigung mit Drice–die effiziente und umweltfreundliche Lösung," CryoGenesis, 5 pages, date unknown.

* cited by examiner

Primary Examiner—William Briggs
(74) Attorney, Agent, or Firm—Foley & Lardner

(57) ABSTRACT

The invention relates to a method for discharging cutting products from a metal-cutting machining process and to a machining process. In order to achieve a good discharge of cutting products at a relatively low outlay and with low costs, it is proposed that solid $CO_2$ particles (2) be supplied to a gas stream (5), the gas stream, together with taken-up solid $CO_2$ particles, be supplied to a machining space, in which the machining process is carried out, and be directed onto a region in the machining space in which a workpiece (7) is cutting-machined by a tool (6).

9 Claims, 1 Drawing Sheet

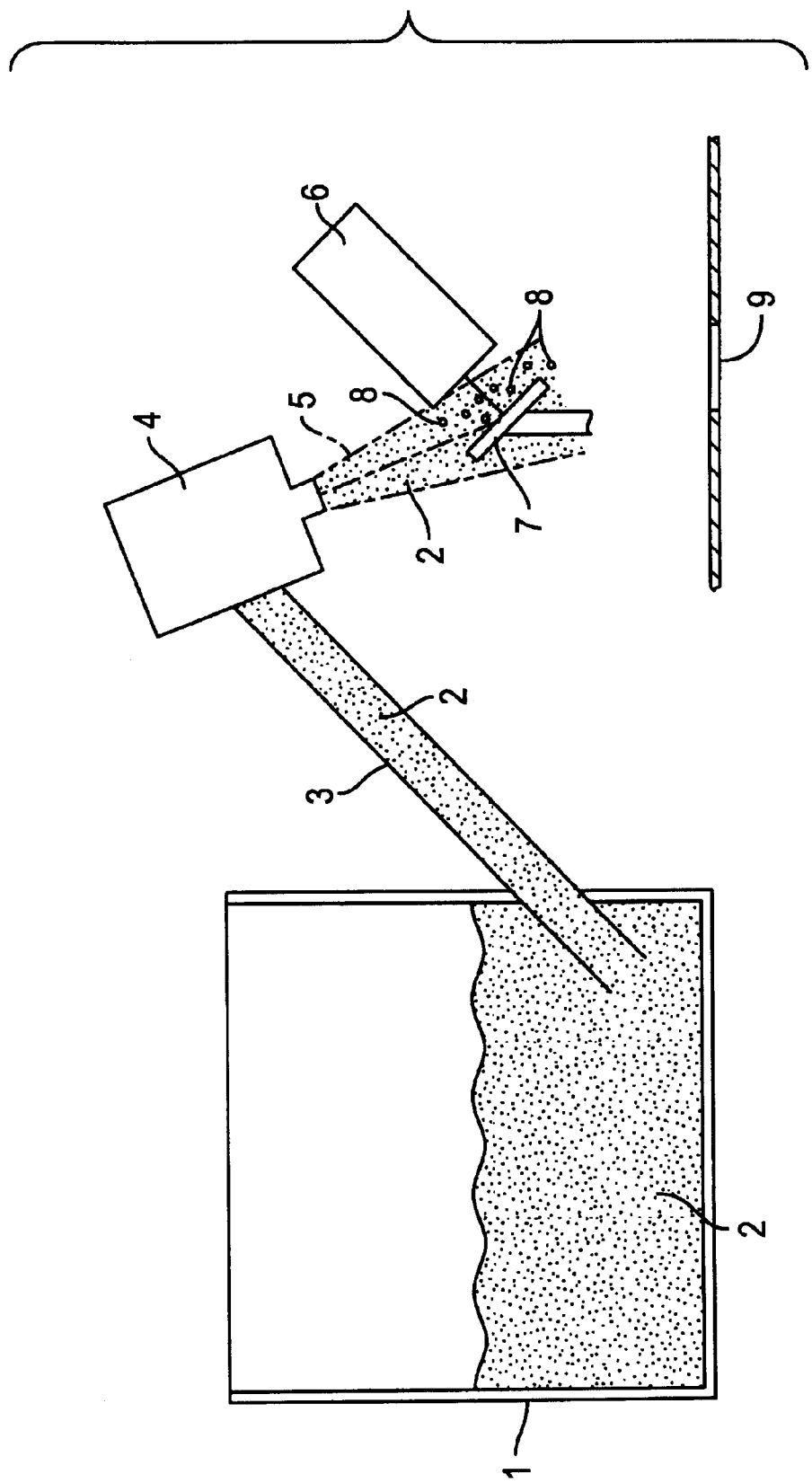

METHOD FOR DISCHARGING CUTTING PRODUCTS FROM A METAL-CUTTING MACHINING PROCESS

BACKGROUND OF THE INVENTION

The present invention relates to a method for discharging cutting products from a metal-cutting machining process and to a metal-cutting machining process, in which a workpiece is machined by a tool, and in which cutting products are produced and are discharged.

In metal-cutting machining processes, such as, for example, turning, milling or drilling processes, a workpiece or product to be cut is machined by a tool in a cutting machine. In addition to cooling the workpiece and tool and lubricating the cut face, it is generally necessary to discharge cutting products, in particular chips and dust, which occur, so that they do not settle on the machine tool or in the machining space.

For this purpose, on the one hand, coolant lubrication can be carried out, in which large quantities of liquid are directed onto the cut face and thereby cool the workpiece and tool and, at the same time, cause lubrication. As a result of this, although good cooling and lubrication are achieved, in general, large quantities of liquid intermingled with the cutting products occur and subsequently, in turn, have to be discharged. For conditioning, the cutting products first have to be extracted from these liquid quantities which have occurred and then have to be cleared of liquid residues, so that they can subsequently, in turn, be used further, for example, melted down. This necessitates, correspondingly, a complicated and cost-intensive supply and discharge of the cooling lubricant and a reconditioning of the coolant and cutting products. Furthermore, liquid droplets intermingled with the cutting products may settle in the machining space, for example, on the machine tool, so that, in general, thorough cleaning of these is necessary after a lengthy period of operation. Moreover, in general, despite the machine tool being enclosed, the workstation becomes severely fouled with oil, so that the operating personnel may possibly also be contaminated.

Machining processes with minimal-quantity lubrication are also known, in which relatively small quantities of lubricant are supplied directly to the cut face, in particular via the tool. In these processes, there is no stream of cooling lubricant, so that the cutting products are discharged solely as a result of gravity and arrive at a discharge device, that is to say, a chip conveyor. Chips and dust particles, together with small quantities of lubricant, may therefore be deposited everywhere within the machine, so that, in the course of a day's production, thick layers of dirt have to be cleaned off. This necessitates a high outlay in terms of corresponding production stoppages and sometimes manual cleaning operations. Furthermore, minimal-quantity lubrication cannot influence the generation of temperature, so that overheating problems may possibly arise.

DE 43 26 517 A1 discloses a process for the cutting machining of metallic workpieces with cooling, in which liquid $CO_2$ emerges from a nozzle and expands, with the result that a mixture of gaseous cold carbon dioxide and dry ice is formed. This mixture is directed onto a machining point in the cutting machine of a metallic workpiece. The desired cooling of the machining point is thereby achieved.

SUMMARY OF THE INVENTION

One object of the present invention is to provide an improved method for discharging cutting products from a metal-cutting machining process, as compared with the prior art.

It is a particular object of the invention to provide a method for the discharge of cutting products and a metal-cutting machining process, by means of which high purity can be ensured at a relatively low outlay of equipment and material, and with low costs.

Further objects, features and advantages of the present invention will become apparent from the detailed description of preferred embodiments that follows, when considered together with the accompanying figure of drawing.

In accomplishing these and other objects, there has been provided according to one aspect of the present invention a method for discharging cutting products from a metal-cutting machining process in which a workpiece is subject to machining, comprising:

providing a gas stream;

introducing solid $CO_2$ particles into the gas stream, to produce a gas stream with entrained $CO_2$ particles; and impinging the gas stream with entrained $CO_2$ particles into a machining space, in which the machining process is carried out, and onto the workpiece in a region in the machining space in which the workpiece is subject to machining, such that at least a significant part of the cutting products produced by the machining is impacted upon by the gas stream in such a way that the cutting products are struck by the $CO_2$ particles.

In accordance with another aspect of the invention, there has been provided a metal-cutting machining process, comprising:

machining a workpiece with a tool at a cut face, such that cutting products, including chips and/or dust, are produced;

discharging the cutting products according to a method for discharging cutting products as defined above, wherein the gas stream, together with entrained $CO_2$ particles, impinges the workpiece and tool at least in the region of a cut face; and further supplying a lubricant to the cut face via the tool.

BRIEF DESCRIPTION OF THE DRAWINGS

The FIGURE schematically shows the use of a method according to the invention in a machine tool.

DETAILED DESCRIPTION OF THE PREFERRED EMBODIMENT

The present invention comprises a method for the discharge of cutting products from a metal-cutting machining process, in which solid $CO_2$ particles are supplied to a gas stream via a conveyor device. The gas stream, together with taken-up solid $CO_2$ particles, is supplied to a machining space, in which the machining process is carried out, and is directed onto a region in the machining space in which a workpiece is cutting-machined by a tool. At least a large part of the cutting products produced is taken up or caught up by the gas stream in such a way that the cutting products are struck by the $CO_2$ particles.

Furthermore, in a preferred embodiment of the metal-cutting machining process initially mentioned, the gas stream, together with taken-up $CO_2$ particles, impacts upon the workpiece and the tool, at least in the region of the cut face, and, moreover, at least a large part of the cutting products produced is struck by the $CO_2$ particles. Also, a lubricant is supplied to the cut face via the tool.

According to the invention, therefore, the cutting products, in particular chips and dust, are struck by carbon dioxide particles or dry ice particles in a gas stream. During this collision, kinetic energy is transmitted correspondingly to the solid carbon dioxide particles, or the kinetic energy of the carbon dioxide particles is released on impact. Since solid carbon dioxide or dry ice is immediately sublimed, that is to say changes into the gaseous state, when energy is supplied to it, no dirt or residual quantities of a coolant are left behind on the cutting products. The cutting products are influenced in a controlled manner along their flight path by collision with the $CO_2$ particles and are jolted in the direction of flight of the $CO_2$ particle which is sublimated on impact. The flight path of the cutting products can thus be aimed in a desired direction which corresponds approximately to the direction of the gas stream, so that they are deflected in a controlled manner to a discharge device, for example, a chip conveyor.

Thus, on the one hand, the cutting products can be at least largely prevented from being distributed over the machining space and, on the other hand, a discharge of the cutting products, without, for example, cooling lubricant or other liquids being admixed with them, can be achieved, so that relatively simple and cost-effective reconditioning of the cutting products is subsequently possible. Moreover, cooling is achieved by means of the carbon dioxide particles which strike the tool and workpiece, for example, even in the region of the cut face, so that there is no need for the further use of additional coolants. It is thus possible to employ a minimal-quantity lubricating method, in which only small lubricant quantities are supplied to the cut face, without thereby causing an appreciable cooling effect.

What is at the same time also achieved according to the invention is that the minimal lubricant quantities supplied, together with cutting products possibly adhering to them, are likewise cooled and are entrained by the gas stream, so that they are not distributed in the machining space.

Since the cutting products are cooled by being struck by the carbon dioxide particles, there is also a reduction in the risk that these particles will be burnt on when they strike an object.

Advantageously, the cooling of the tool and workpiece can be achieved directly by controlling the quantity of carbon dioxide particles supplied and/or the intensity of the gas stream.

The control of the quantity of carbon dioxide particles supplied and/or of the intensity of the gas stream may advantageously also be set in such a way that a large part of the cutting products occurring is struck (in flight) by the $CO_2$ particles. This setting may be carried out before the respective machining process or else during the machining process itself.

The carbon dioxide particles used may be, in particular, particles of pressed carbon dioxide ice. Air or gas with a pressure of, for example, 2 to 7 bar may be used.

As compared with the method of DE 43 26 517 A1, in which only cooling of the machined region of the workpiece is achieved, according to the invention the cutting products are struck after they occur, that is to say in flight, by the $CO_2$ particles. This may take place, in particular, with $CO_2$ particles of pressed $CO_2$ ice which cannot be produced in the method of DE 43 26 517 A1. Furthermore, in this method according to the prior art, it is not possible to vary the intensity of the gas stream independently of the quantity of $CO_2$ particles supplied, in order to achieve a setting such that a large part of the resulting cutting products is intercepted.

According to the invention, in particular, the cutting machining of materials where explosive dusts occur is possible. These materials include, in particular, aluminum and magnesium and also their alloys. Due to the carbon dioxide particles striking the chips and dust particles produced, on the one hand, the direct risk of explosion is reduced. Furthermore, an inert gas, such as, for example, nitrogen may be used for the gas stream, so that the cutting products produced come into contact only with this inert gas and gaseous carbon dioxide which has originated from the carbon dioxide particles. For the machining of materials where highly explosive particles do not occur, it is generally more cost-effective for compressed air to be used.

The discharge of the cutting products by, for example, a chip conveyor or a suction-extraction device alone may be improved by an active suction-extraction of the gas stream and of the gaseous carbon dioxide produced, since, as a result of suction-extraction, the stream of cutting products can be oriented more accurately.

The workpiece, after being completed, can be cleaned immediately by the tool being removed and the workpiece being cleaned of chip residues and grease or lubricant in the gas stream containing $CO_2$ particles. The workpiece is advantageously turned over in the gas stream.

The machine tool and the machining space can likewise be cleaned by the gas stream containing $CO_2$ particles before, after or during machining.

The invention is explained in more detail below by means of preferred embodiments, with reference to the accompanying drawing. The FIGURE schematically shows the use of a method according to the invention in a machine tool.

From a collecting container 1 containing solid carbon dioxide particles 2, carbon dioxide particles 2 are supplied as individual particles to a Venturi tube 4, via a conveyor worm 3. In the Venturi tube 4 the carbon dioxide particles 2 are taken up by a gas stream 5 which is generated. The gas stream 5, together with taken-up carbon dioxide particles 2, is directed onto a region in which a tool 6, for example, a spindle with a drill bit, machines a workpiece 7. The tool may also be a lathe or milling machine or, in general, a machining center. During cutting machining, cutting product particles 8, that is to say chips and dust particles, occur in a known way. Since the cutting products are produced in the region of the workpiece 5 that is impacted by the gas stream, they are struck predominantly by $CO_2$ particles 2. During this striking action, the kinetic energy of the $CO_2$ particles and, where appropriate, of the cutting product particles is released when they are braked or decelerated. This kinetic energy release causes evaporation or sublimation of solid carbon dioxide particles, to form gaseous carbon dioxide. At the same time, the evaporating particle extracts heat from the surroundings, as a result of which, in particular, the cutting product particles 8 are cooled. These cutting product particles 8 are thus braked by the collision with the $CO_2$ particles 2 and/or are aimed in the direction of flight of the $CO_2$ particles 2 and of the gas stream 5. The particles 8 are, in this case, subsequently entrained further by the gas stream 5, which arrives at a suction-extraction device 9. Using the suction-extraction device, the gas stream can be maintained from the Venturi tube 4 as far as this suction-extraction device, so that distribution of the particles 8 in the machining space is thereby restricted even further. Near the suction-extraction device 9, for example, a chip conveyor may be provided, which continuously transports away the cutting products produced.

The cut face of the workpiece 7, at which the latter is machined by the tool 6, is lubricated by minimal-quantity lubrication which is advantageously carried out via the tool 6. Since the gas stream together with carbon dioxide particles leads to cooling of the tool and the workpiece, in particular of the cut face too, there is no need to use further coolants.

In principle, a temperature sensor may be provided, for example, on the tool. In the event of the excessive heating, the cooling action may be intensified, either by increasing the gas stream or by increasing the particle quantity conveyed by the conveyor worm 3.

The intensity of the gas stream can be obtained, for example, via a setting of the pressure of the compressed air or pressurized nitrogen used, or any other conventional techniques.

The size and shape of the $CO_2$ particles is not critical and can be varied according to needs dictated by the machining process and/or equipment. According to a typical embodiment, they are, for example, elongate and, for example, have a length of a few millimeters and a diameter of 0.5–2 mm.

The entire disclosure of the priority document for this application, i.e., German patent application No. 199 15 619.0, filed Apr. 7, 1999, is hereby incorporated by reference.

It will be apparent to those skilled in this art that various changes and modifications can be made to the specific apparatus and process steps that have been described above in connection with the preferred embodiments of the invention. It is intended that these alternatives that include the principles according to the present invention are to be included within the scope of the following claims.

I claim:

1. A metal-cutting machining process, comprising:

machining a workpiece with a tool at a cut face, such that cutting products, including chips and/or dust, are produced;

providing a gas stream introducing solid $CO_2$ particles into the gas stream, to produce a gas stream with entrained $CO_2$ particles; and impinging the gas stream with entrained $CO_2$ particles into a machining space, in which the machining process is carried out, and onto the workpiece and tool at least in the region of the cut face such that at least a significant part of the cutting products produced by the machining are impacted upon by the gas stream in such a way that the cutting products are struck by the $CO_2$ particles and thereby discharged; and further supplying a lubricant to the cut face via the tool.

2. A machining process as claimed in claim 1, wherein at least a major part of the cutting products produced are struck by the $CO_2$ particles.

3. A machining process as claimed in claim 1, wherein minimal-quantity lubrication is carried out, and a cooling of the tool and workpiece is adjusted by varying at least one of the gas stream and the quantity of $CO_2$ particles supplied.

4. A machining process as claimed in claim 1, wherein a workpiece comprising aluminum, magnesium or an aluminum or magnesium alloy is machined, and wherein the gas stream comprises an inert gas.

5. A machining process as claimed in claim 4, wherein the gas stream comprises nitrogen.

6. A machining process as claimed in claim 1, which is a turning, milling, honing or drilling process.

7. A machining process as claimed in claim 1, further comprising, after the workpiece has been completed, cleaning the workpiece by the gas stream containing $CO_2$ particles.

8. A machining process as claimed in claim 7, further comprising turning the workpiece over during cleaning.

9. A machining process as claimed in claim 1, further comprising cleaning the machine tool and also the machining space by the gas stream containing $CO_2$ particles during at least one of the procedures of machining the workpiece, before completion of the workpiece and after completion of the workpiece.

* * * * *